(12) United States Patent
Hastings (10) Patent No.: US 12,245,604 B2
(45) Date of Patent: Mar. 11, 2025

(54) OVEN SMOKER

(71) Applicant: FISHER & PAYKEL APPLIANCES LIMITED, Auckland (NZ)

(72) Inventor: David Leslie Hastings, Dunedin (NZ)

(73) Assignee: FISHER & PAYKEL APPLIANCES LIMITED (NZ)

( * ) Notice: Subject to any disclaimer, the term of this patent is extended or adjusted under 35 U.S.C. 154(b) by 381 days.

(21) Appl. No.: 17/630,555

(22) PCT Filed: Jul. 29, 2020

(86) PCT No.: PCT/NZ2020/050079
§ 371 (c)(1),
(2) Date: Jan. 27, 2022

(87) PCT Pub. No.: WO2021/020974
PCT Pub. Date: Feb. 4, 2021

(65) Prior Publication Data
US 2022/0248696 A1    Aug. 11, 2022

(30) Foreign Application Priority Data
Jul. 29, 2019   (NZ) ...................................... 755828

(51) Int. Cl.
*A23B 4/052* (2006.01)
*F24C 1/04* (2021.01)
*F24C 15/20* (2006.01)

(52) U.S. Cl.
CPC .............. *A23B 4/0523* (2013.01); *F24C 1/04* (2013.01); *F24C 15/2007* (2013.01)

(58) Field of Classification Search
CPC ....... A23B 4/044; A23B 4/052; A23B 4/0523; F24C 1/04; F24C 15/2007; A47J 37/0664
USPC ........................................................ 126/21 R
See application file for complete search history.

(56) References Cited

U.S. PATENT DOCUMENTS

| 4,474,107 A | 10/1984 | Cothran |
| 7,755,005 B2 | 7/2010 | Bartelick et al. |
| 8,042,459 B2 | 10/2011 | Wu |

(Continued)

FOREIGN PATENT DOCUMENTS

| DE | 10021235 A1 | 10/2001 |
| EP | 2009356 A1 | 12/2008 |

(Continued)

*Primary Examiner* — Alfred Basichas
(74) *Attorney, Agent, or Firm* — Clark Hill PLC; James R. Foley (57) ABSTRACT

A cooking appliance including a cooking chamber for cooking food items, the cooking chamber having a base, at least one wall and a door. A smoke generator is provided in the cooking chamber, the smoke generator made up of a smoke generation compartment in the base, a wall or the door of the cooking chamber and an igniter in, or installable in, the compartment. A fluid injector may be provided to inject a combustion-enhancing fluid such as air into the compartment. Combustible material, such as wood chips, is added to the compartment, covered by a vented compartment lid and then an automated process ignites the wood chips and feeds combustion-enhancing fluid to the compartment to maintain combustion and generation of smoke for smoking the food items.

20 Claims, 5 Drawing Sheets

(56) References Cited

U.S. PATENT DOCUMENTS

| | | | |
|---|---|---|---|
| 8,304,697 B2 * | 11/2012 | McGhee, Jr. | A23B 4/044 |
| | | | 219/400 |
| 10,314,433 B1 | 6/2019 | Knight | |
| 2009/0004348 A1 * | 1/2009 | Silva | A23B 4/052 |
| | | | 426/315 |
| 2010/0229896 A1 | 9/2010 | Bartelick | |
| 2013/0213243 A1 * | 8/2013 | Borovicka | A47J 37/0786 |
| | | | 99/482 |

FOREIGN PATENT DOCUMENTS

| | | | | |
|---|---|---|---|---|
| EP | 2093490 A1 * | 8/2009 | | F24C 14/02 |
| IN | 205266832 U | 6/2016 | | |
| KR | 20130031610 A * | 3/2013 | | F24C 7/00 |
| KR | 101835805 B1 | 3/2018 | | |
| WO | 2016093481 A1 | 6/2016 | | |

* cited by examiner

OVEN SMOKER

This application is a National Phase Filing of PCT/NZ2020/050079, having an International filing date of Jul. 29, 2020, which claims priority of New Zealand Patent Application No. 755828, filed Jul. 27, 2019. The disclosure of the foregoing are hereby incorporated by reference.

TECHNICAL FIELD

This invention relates to cooking appliances, in particular though not solely to cookers that include a cooking chamber with smoking functionality for smoking food items.

BACKGROUND ART

Smoking is used as a method of preparing and cooking food to improve the visual appearance, taste, and smell of food. Traditionally, food smoking involves exposing the food to smoke, often generated by combustion, and frequently, a fire. At least domestically, smoking of food is usually carried out outside the house, to avoid smoke being released inside the house. Typically, domestic food smoking equipment is assembled and operated by one person in a household and it is therefore difficult for other household members to locate/operate the equipment in the absence of the normal operator. Only the normal operator, after considerable experience with the particular smoking equipment, combustible fuel and ignition source, will be aware of the storage location, assembly requirements and desirable settings/techniques for its operation that will achieve a desirable food smoking result.

SUMMARY OF INVENTION

It is an object of the present invention to provide a cooking appliance with a smoker that at least partially ameliorates at least some of the above shortcomings and/or to at least provide the public with a useful choice.

In a first aspect, the invention consists in a cooking appliance, comprising:
  a cooking chamber for cooking food, the cooking chamber having a base, at least one wall, and a door for closing the cooking chamber, and
  a smoke generator in the cooking chamber comprising:
    a compartment in the base, a wall or the door of the cooking chamber for smoke generation, and
    an igniter in or installable in the compartment.

Optionally, the compartment is formed as a recessed cavity in the base, a wall or the door of the cooking chamber, and/or the compartment is disposed in the base, a wall or the door of the cooking chamber.

Optionally, the compartment is located in the cooking chamber base at or adjacent to the door.

Optionally, the cooking appliance further comprises a controller connected to the igniter and adapted to energise the igniter.

Optionally, the cooking appliance further comprises a fluid injector in the compartment that is connected to the controller, the fluid injector controllable to inject combustion-enhancing fluid into the compartment.

Optionally, the cooking appliance further comprises a fluid pump connected to the controller, wherein the fluid pump is controllable to pump combustion-enhancing fluid via the fluid injector into the compartment.

Optionally, the compartment is configured to receive and hold a discrete charge of a combustible fuel for generating smoke.

Optionally, the igniter is a resistive tubular sheath heater, or a heated coil element or a surface heater.

Optionally, the compartment has a single access opening and a removable lid is provided for closing the single access opening.

Optionally, the removable lid is provided with at least one vent hole therein.

Optionally, the cooking appliance further comprises a vent via which gases from the cooking chamber may be exhausted wherein a catalytic smoke eliminator is provided for removing smoke from the exhaust gases.

In a second aspect, the invention consists in a cooking appliance, comprising:
  a cooking chamber for cooking food,
  a smoke generator in the cooking chamber, and
  a fluid injector for supplying combustion-enhancing fluid to the smoke generator to promote generation of smoke.

Optionally, the chamber has a base, at least one wall and a door for closing the chamber, and wherein the smoke generator comprises:
  a compartment in the base, a wall or the door of the cooking chamber for smoke generation, and
  an igniter in or installable in the compartment.

Optionally, the compartment is located in the cooking chamber base at or adjacent to the door.

Optionally, the cooking appliance further comprises a controller connected to the igniter and adapted to energise the igniter.

Optionally, the cooking appliance further comprises a fluid injector in the compartment that is connected to the controller, the fluid injector controllable to inject combustion-enhancing fluid into the cooking chamber.

Optionally, the cooking appliance further comprises a fluid pump connected to the controller, wherein the fluid pump is controllable to pump combustion-enhancing fluid via the fluid injector into the cooking chamber.

Optionally, the compartment is configured to receive and hold a discrete charge of a combustible fuel for generating smoke.

Optionally, the compartment has a single access opening and a removable lid is provided for closing the single access opening.

Optionally, the removable lid is provided with at least one vent hole therein.

Optionally, the igniter is a resistive tubular sheath heater, or a heated coil element or a surface heater.

Optionally, the cooking appliance further comprises a vent via which gases from the cooking chamber may be exhausted wherein a catalytic smoke eliminator is provided for removing smoke from the exhaust gases.

Optionally, the cooking appliance is an oven with a door that closes and hermetically seals the cooking chamber.

In a third aspect, the invention consists in a method of operating a cooking appliance, comprising the steps of:
  loading fuel into a compartment of a smoke generator within a cooking chamber of the cooking appliance, and
  operating the smoke generator within the chamber to perform a smoke-generating cycle.

Optionally, the method further comprises the step of:
  at the completion of the smoke-generating cycle, carrying out a pyrolytic cleaning operation of the cooking chamber.

Optionally, the smoke-generating cycle comprises:
energising an igniter in the compartment to initiate combustion of the fuel, and
activating a fluid injector in the compartment to inject combustion-enhancing fluid into the compartment.

Optionally, the method further comprises the step of:
at the commencement of the smoke-generating cycle, locking a door of the cooking chamber in a closed position.

Optionally, the method further comprises exhausting gases from the cooking chamber, wherein the exhaust gases are passed through a Catalytic Smoke Eliminator.

Optionally, the method further comprises the step of:
detecting a temperature within the compartment and/or of gases exiting the cooking chamber and controlling the smoke-generating cycle based upon the detected temperature.

Optionally, the step of loading fuel into a compartment comprises loading fuel into the compartment via a single access opening, and smoke generated during the smoke-generating cycle enters the cooking chamber via the single access opening.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner. This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF DRAWINGS

Preferred forms of the invention will now be described with reference to the accompanying drawings, in which.

DESCRIPTION OF EMBODIMENTS

General Preferred Embodiment

Figure 1:
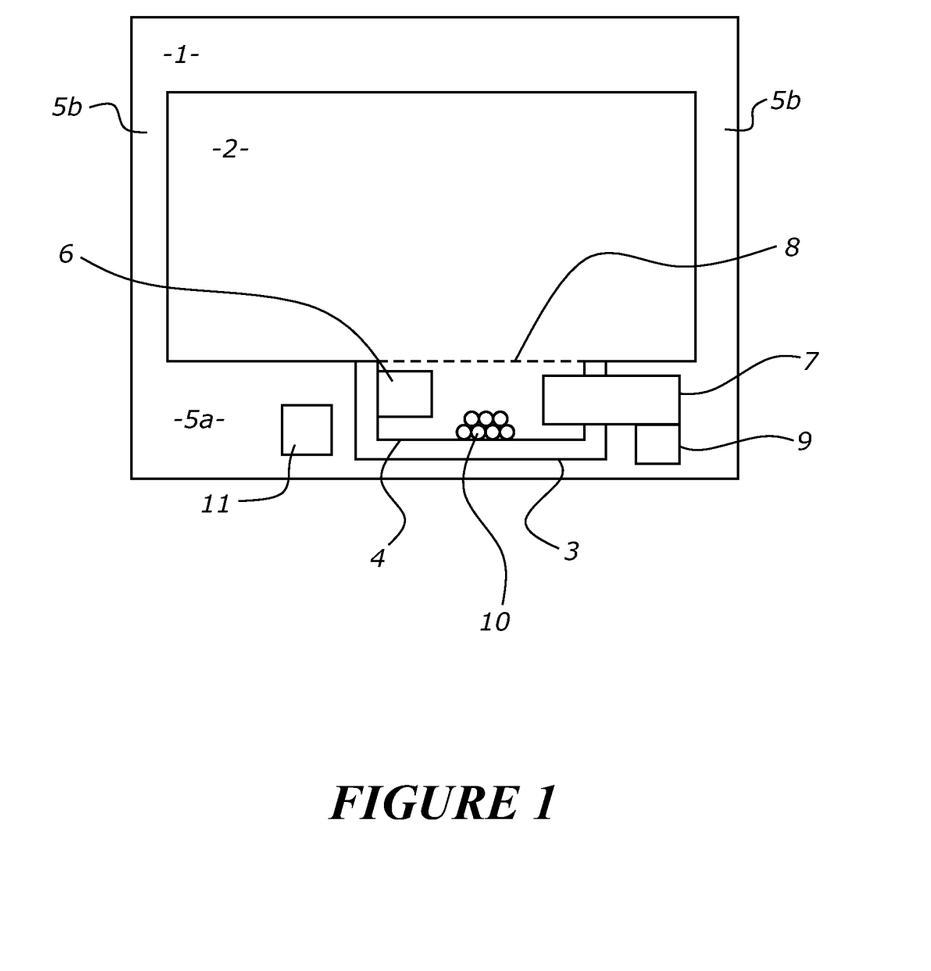
FIG. 1 is a block diagram of an oven including a smoker.

FIG. 1 shows a general preferred embodiment in schematic form of an oven 1 of a cooking appliance with a cooking chamber 2 for cooking food positioned therein via a chamber door (not shown in FIG. 1). The oven 1 has a smoke generator (referred to hereinafter simply as "smoker") 3, providing the oven 1 with the ability to smoke food (hereinafter referred to as a "smoking function"). Preferably, a user using the oven 1 can select a smoke cycle (hereinafter referred to as a "smoking function") to smoke the food in either a hot (or heated) state, a cold (or unheated) state, or at any temperature in between by setting a desired oven temperature in the known way. The smoker 3 when used in the oven 1 can enhance the smell, taste, and visual appearance of the food being cooked/smoked. The smoker 3 can be used as a standalone method of cooking, or it can be used in conjunction with other cooking functions, such as baking, heating or the like.

The smoker 3 in the preferred form includes a smoker compartment 4 in the bottom wall (floor/base) 5a, or other wall 5b, or the door of the oven 1, an igniter 6 in the compartment 4, and a fluid injector 7. Smoker compartment 4 may be in the form of a fully or partially recessed (that is, not flush with the surrounding internal surface of the cooking chamber) cavity or fire box. An oven controller 11 is provided at a suitable position in/on or adjacent to the cooking appliance, and is connected to the igniter 6 in order to operate the igniter 6. A removable/pivotable lid 8 (preferably vented) is provided over the compartment 4 to allow a user to access the compartment. A fluid pump (such as an air pump) 9 is provided at a suitable position in/on or adjacent to the cooking appliance for pumping combustion-enhancing fluid to smoker compartment 4 and is either fluidly coupled (for example via a rubber hose) to the fluid injector 7, or is at least a part of the fluid injector 7. Fluid pump 9 is also connected to oven controller 11 so that it can be activated to cause combustion-enhancing fluid to flow into smoker compartment 4 via fluid injector 7.

Smoker compartment 4 may be formed as a recess in the inner surface of base wall 5a of the oven 1. Alternatively, the compartment 4 could be formed in an inner surface of another wall, such as a vertical or side wall 5b, of the oven 1, or even in the inner side of the oven door. Smoker compartment 4 could also be separately-formed and mounted in or on the base or wall or door of oven 1. The fluid injector 7 and/or igniter 6 can be permanently fixed in the smoker compartment 4 or could alternatively be removable. The fluid injector 7 and fluid pump 9 are preferably an air injector and air pump, respectively, although other combustion-enhancing fluids may be pumped/injected. A discrete charge or volume of smoker fuel 10, such as woodchips, wood pellets or other combustible fuel can be placed in smoker compartment 4 by a user. Igniter 6 is connected to oven controller 11 so that it can be energised on demand to ignite the smoker fuel 10, and the fluid injector 7 provides fluid as instructed by oven controller 11 to promote and control combustion of the smoker fuel 10. The fluid pump may be a simple on/off, fixed speed pump or may have the capability of delivering fluid at a desired, variable flow rate, as determined and instructed by oven controller 11.

It is desirable that the fluid, such as air, promotes combustion without producing flames in order to generate smoke. Once air is pumped into smoker compartment 4, the igniter 6 may be energised within smoker compartment 4, initiating combustion of the fuel 10 provided therein and creating smoke. The generated smoke is then delivered/channeled from the smoker 3 to the oven chamber 2 in order to smoke food positioned therein. It is desirable to regulate the amount of air pumped into smoker compartment 4—a sufficient amount/flow rate of air should be pumped into the compartment 4 so that there is controlled smouldering of the smoker fuel 10. If too much air is pumped into the compartment 4 there is a risk of generating flames in compartment 4 which could reduce/eliminate the production of smoke. Flames within compartment 4 are, however, not a major safety concern because the oven door is closed (optionally, locked) during smoking and there is a limited supply of combustible fuel 10 such that any flames will eventually self-extinguish. The fluid injector 7 may include one or more components, some of which may be located at least partially within or which are at least partially installable within the smoker 3, or may be integrated with the rest of oven 1.

Figure 3:
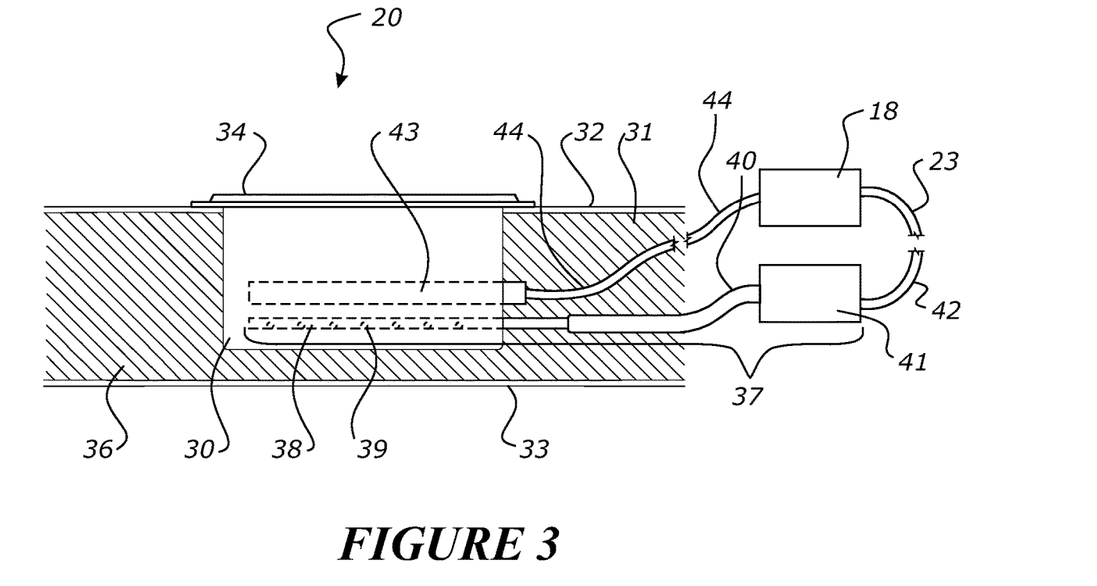
FIG. 3 is a right-side view of the smoker.
Figure 4:
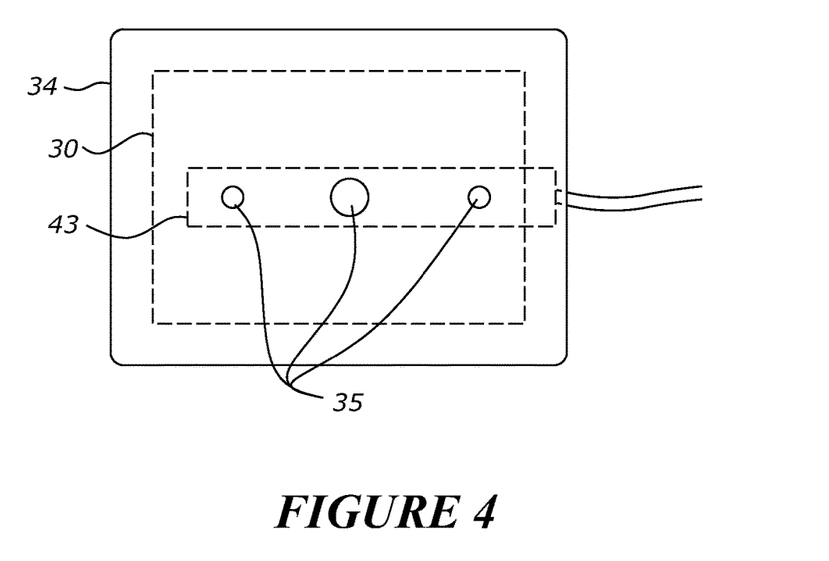
FIG. 4 is a plan elevation view of the smoker.

Preferred embodiments of the present invention will now be described with reference in particular to FIGS. 2 to 4. In these preferred embodiments the oven is at least a part of a cooking appliance such as a freestanding cooker (or "range" or cookstove), or built-in wall oven that may be used in a domestic or commercial setting. The oven may be electrically powered, gas powered, or powered using some other suitable energy source. The invention is however also suitable for use in other cooking appliances such as outdoor barbeques or "grills" which incorporate a lid in place of the oven door referred to herein with regard to the oven embodiments, so that a cooking/smoking chamber is formed above a grilling surface when the lid is closed.

Additional Preferred Embodiment

Figure 2:
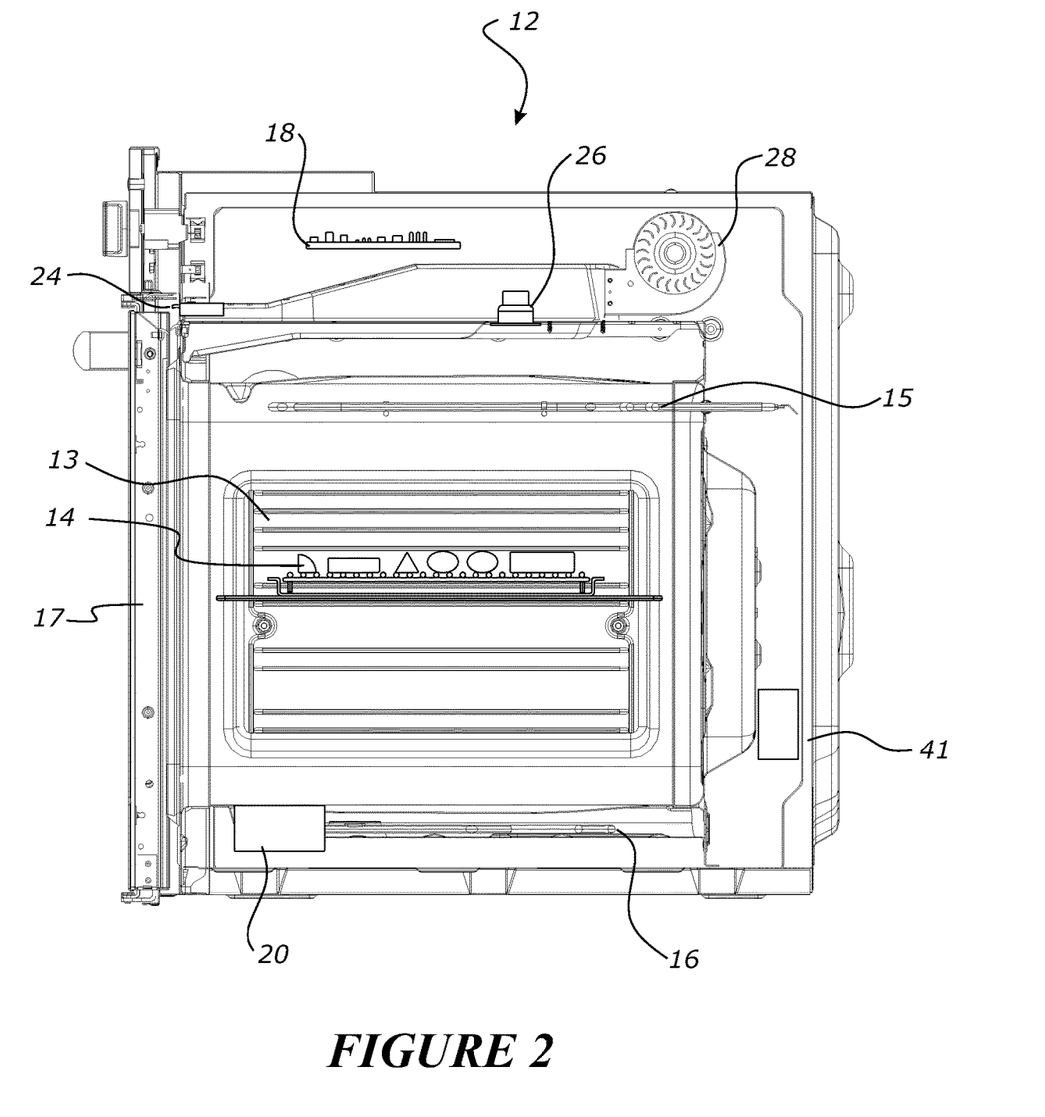
FIG. 2 is right side cross-sectional view of a cooking appliance including the oven.

FIG. 2 shows a right side cross-sectional view of a cooking appliance such as a built-in wall oven 12 (which may be heated by gas and/or electricity) that comprises a smoker 20 according to the general embodiment described above. The oven 12 has a cooking chamber 13 for cooking food items 14 in the usual manner, such as by heating, (fan) baking, defrosting, grilling, or the like. Cooking chamber 13 is made up of upper, lower, rear and two side walls that are assembled together or formed in a rectangular prism or cuboid shape, as is well known, with all edges between adjacent walls sealed such as by welding or forming. The oven 12 has at least one primary heating source within chamber 13 such as an upper heating source 15, a lower heating source 16 or a rear heating source (not shown). The oven 12 has a controller 18 that can monitor system conditions within the chamber 13 of oven 12 and can also control the operation of the oven 12, including the smoker 20. The controller 18 is configured to receive user-specified operational variables (including time and/or temperature for example) as control inputs that a user can provide via a user interface. The controller 18 is configured to automate (such as under software control) other operational variables not predetermined by the user (such as the operation of an oven fan, for example) as well as energising/de-energising components of the smoker in accordance with a preset/automatic or fully/partially user-adjustable/manual operating cycle.

The oven 12 has a chamber door 17 that closes an opening of chamber 13 with a seal compressed between the door and the perimeter of the chamber opening such that when the door is closed, the chamber is hermetically sealed under normal operating conditions. Chamber door 17 optionally has a door latch 24 for holding the door in its closed and sealed position to prevent (or at least minimise) loss of heat and/or smoke through the chamber door 17. As mentioned previously, the door may be locked in its closed position during the smoking cycle by energising, via controller 18, the latch to a locked orientation. The oven 12 also preferably has a Catalytic Smoke Eliminator ("CSE") 26 (which may incorporate a heating element—not shown) and a venting fan 28 to help remove smoke from the gases exhausted, via a vent, from the chamber at any time before, during or after the smoking cycle. The heating element of the catalytic smoke eliminator 26 can be switched on/off, or its power output adjusted, by controller 18. Similarly, venting fan 28 may be switched on or off, or its speed adjusted, by controller 18. Venting fan 28 may also operate to cool electronic components of the cooking appliance, such as controller 18.

Oven 12, in addition to the primary cooking (grilling, baking etc.) heating source, such as heating elements or burners, has a smoker 20 that can be operated to produce smoke required for smoking food items 14. The smoker 20 is shown in more detail in FIG. 3 (which shows a partial cross-section of the base 31 of the oven) and in FIG. 4 (which shows a plan view of the smoker 20). The smoker 20 comprises a smoker compartment 30 that is formed as a recess in or is mounted within the base 31 of the oven. Preferably the smoker is located near the front of the oven chamber, adjacent chamber door 17 to enable access thereto by a user. In the embodiment shown the base 31 comprises an inner surface of the chamber ("chamber floor") 32, and an outer surface 33 of the oven 12. Some non-limiting examples of how the compartment 30 may be formed in the base 31 of the oven 12 are:

The compartment 30 may be a recess formed into the oven panel providing the base 31 of the oven 12. Optionally, a liner, that may or may not be removable, may be located within the recess. The optional liner may be formed from metal such as steel or from another material having high heat and corrosion resistance.

The compartment 30 may be a fire box that is suspended from the edges of a cut-out formed in the oven panel providing chamber floor 32 of the base 31.

As previously mentioned, the smoker compartment could be formed within or inserted into or mounted on the oven chamber's base, a side wall of the oven chamber or the oven door. In any implementation, the top of the smoker compartment may be flush with the inner surface of the chamber or door, or it may be only partially recessed such that it sits proud of the surrounding inner chamber surface.

Preferably, compartment 30 is formed from or lined with stainless steel or other well-known material which has high temperature and corrosion resistance. For example, compartment 30 may be square-shaped in plan view with each side having a length of about 60 mm. The side walls and base of compartment 30 may be semi-cylindrical in shape with flat end walls at either axially-separated end. A removable or at least openable (such as pivoted/hinged) lid 34 may have slightly larger dimensions than the recess or opening of compartment 30 and is placed over compartment 30. Lid 34 may couple to (such as connecting to or resting on) the base of the oven or to compartment 30, such as to an upper rim of the compartment or its liner, if provided. Lid 34 closes the compartment's upper opening which is the sole, only or single opening via which combustible fuel may be introduced into, and combustion products may exit from, the compartment. Preferably a gasket or seal (not shown) is provided between the lid and base 31 (or compartment 30 or its liner). The removable lid 34 has one or more smoke regulation holes or vents 35 to regulate the flow of smoke from smoker compartment 30 into oven chamber 13. The removable lid 34 is preferably made from stainless steel.

Smoker compartment 30 is surrounded by thermal insulation 36 which is conventionally provided within base 31 so that heat is retained in oven chamber 13 and/or smoker compartment 30.

An air injector 37 is provided for the smoker 20. The air injector 37 includes an air injector tube 38 disposed in the compartment 30, preferably with its longitudinal extent in the plane of the axis of the semi-cylindrical side/base wall of the compartment 30 and about 10 mm above that wall. The air injector tube 38 may have a diameter of about 5 mm and extend in a cantilevered fashion (as shown in FIG. 3) from an end wall of the smoker compartment 30 or it may be supported by the end walls of the compartment/liner at both of its longitudinally-separated ends. The air injector tube 38 is preferably formed from stainless steel with multiple openings 39 to allow injection of air (or other combustion-enhancing fluid) to smoker compartment 30. Ideally, holes 39 are formed so that they direct air downwardly, that is, below horizontal.

Air injector 37 may also include an air pump 41 and an air tube 40. Air tube 40 is coupled to the air injector tube 38 and passes through the base of the oven to the air pump 41 which is disposed at some suitable position in/on the oven. The air pump 41 is controlled by controller 18 (via a cable 42) to provide air to the air injector 37. The term "air injector" as used herein could refer only to the air injector tube 38 itself within smoker compartment 30, or alternatively injector tube 38 and also the air tube 40 extending through the base 31 and/or the air pump 41, depending on the context. Air injector 37 promotes initial ignition of combustible material positioned in the smoker compartment and also promotes ongoing burning of that material when or if necessary. In an alternative embodiment, the air injector 37 could be removable from the compartment such as by a coupling that enables detachment/reattachment from/to the air tube 40.

At least part of an igniter 43 is also disposed in the smoker compartment 30, extending in a cantilevered fashion from an end wall (or alternatively, fixed to both end walls) of the compartment 30 and positioned above injector tube 38. In an alternative embodiment, the igniter 43 could be removable from the compartment 30 and from an electrical connection with the controller 18 via cable 44. The igniter may have a diameter of about 10 mm and is preferably positioned with its longitudinal extent parallel to the injector tube 38 and about 10 mm above it. The igniter 43 (which may be referred to as a "heating element") could be an electric igniter similar to those used in pellet-burning stoves which are usually a resistive element often encapsulated in a tubular ceramic casing, or any other kind of hot surface igniter known to a person skilled in the art, such as a heated coil element or surface heater. Controller 18 may be operated to control the igniter 43 to initiate and maintain combustion within the smoker compartment by suitably modulating its output power.

Controller 18 may be positioned at any suitable location in/on the cooking appliance. It could be the same controller that controls the general operation of the oven, or it could be a dedicated controller for the smoker. Alternatively, separate controllers could be used for the air pump 41/air injector 37 and for igniter 43.

Without limitation, depending on the arrangement of the smoker compartment 30, igniter 43 and air injector 38, the term "smoker" could refer to only the compartment 30 (adapted to receive the igniter and/or air injector), or to the smoker compartment in combination with the igniter and/or air injector, as context will determine. Controller 18 and/or the air pump 41, and the electrical and air connections between them and the igniter and fluid injector might also be considered part of the smoker, as context will determine.

Usage

Figure 5A:
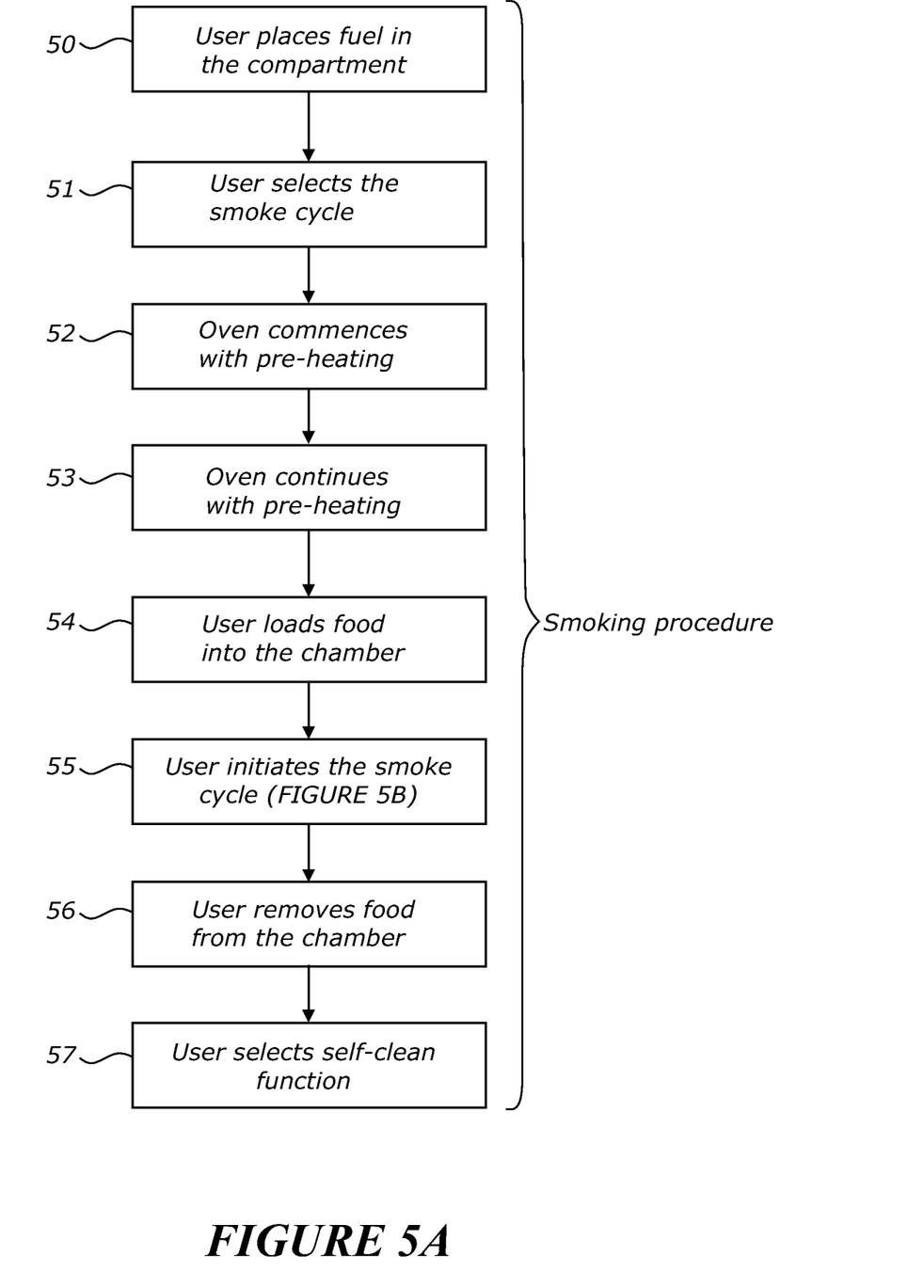
FIG. 5A is a flow diagram of a smoking procedure according to the disclosed preferred embodiments of the invention.

Use of smoker 20 in oven 12 will now be described with reference to an exemplary smoking procedure, as set out in steps 50-57 of FIGS. 5A and 5B. The smoking procedure describes the steps taken by the user and oven to smoke food items. Step 55 of the smoking procedure set out in FIG. 5A is initiation of a smoke cycle, which comprises a series of actions (see FIG. 5B) that the controller 18 undertakes to operate the smoker 20 and other components of the oven 12 in order to carry out the smoking process in the oven. The smoke cycle is therefore a subset of steps that takes place within the overall smoking procedure. Controller 18 is configured to operate the smoker 20 and other components of the oven 12 according to the smoke cycle (step 55). The following assumes that suitable smoker fuel has been pre-loaded into smoker compartment 30.

Figure 5B:
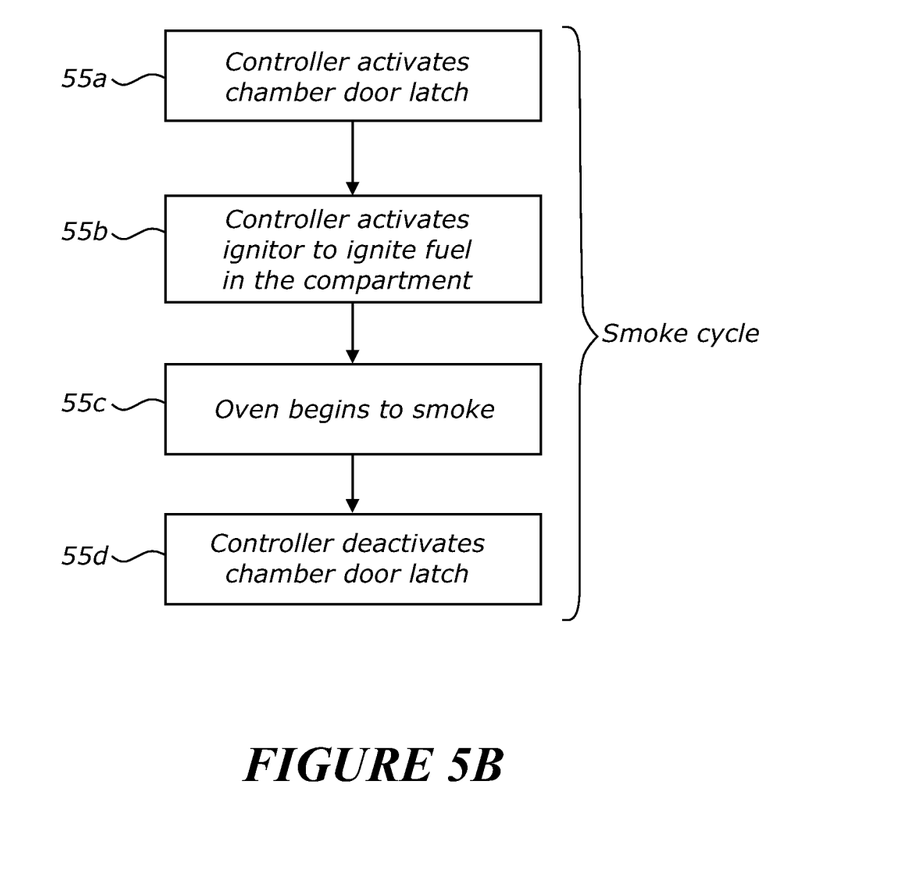
FIG. 5B is a flow diagram of how step 55 of the smoking procedure of FIG. 5A could be performed according to the disclosed preferred embodiments.

The following is an explanation of each of the steps set out in the flow diagrams of FIGS. 5A and 5B:

Step 50—The user places fuel in smoker compartment 30.

The fuel could be any variety of dried, natural untreated wood (pellets, chips, chunks, etc.). 15-25 g of wood pellets is a suitable amount of fuel for an oven capacity of between around 60 to 70 litres. The fuel will be adjacent to or in contact with the igniter 43. The user then replaces the removable lid 34 over the compartment 30 and closes oven chamber door 17.

Step 51—The user selects the smoke cycle on the user interface of the cooking appliance.

Controller 18 then implements the various functions and/or operates the various components of the oven 12 to carry out smoking of the food items. The user may select or set a cooking/smoking time period and a smoking/cooking temperature, or these may be preset.

Step 52—Oven 12 commences with pre-heating.

Controller 18 instructs oven 12 to commence pre-heating. Pre-heating is preferably carried out in a similar manner to how an oven is normally pre-heated before baking. The pre-heating temperature (for example, 115° C.) may be user-adjustable and set based on the food 14 that is being smoked. Controller 18 activates the catalytic smoke eliminator 26 by energising its heating element, if provided.

Step 53—Oven 12 continues with pre-heating.

Once the oven reaches the set pre-heating temperature, controller 18 may continue with oven pre-heating until a predetermined pre-heating time period has expired. For example, the pre-heating period may be set to a value between 10 and 15 minutes; however, the length of time can be user-adjusted. Having a set period of time for the pre-heating period ensures that the catalytic smoke eliminator 26 will reach its required temperature for eliminating smoke. The cooking appliance then sounds an audible alarm and/or activates a visible alert such as by flashing a light on the user interface or displaying an appropriate message on a display screen to prompt the user to load food items 14 into the chamber 13.

Step 54—The user loads food 14 into the chamber 13.

The food items 14 may, for example, be supported on wire racks to allow smoke to completely surround the food 14. A drip tray may be placed beneath the food items 14.

Step 55—The user initiates the smoke cycle.

The user can, for example, press an appropriate button on the user interface of the cooking appliance to commence the smoke cycle. An exemplary smoke cycle as shown in FIG. 5B will now be described according to steps 55a to step 55d:

Step 55a—The controller 18 activates the oven chamber door latch 24, locking the chamber door closed. The latch is preferably electronically controlled by the controller 18, however the latch 24 may also have a manual override that deactivates the latch 24 so that the user can manually open the chamber door.

Step 55b—Controller 18 activates igniter 43 to commence combustion of the fuel in smoker compartment 30.

Preferably at the same time, controller 18 operates air injector 37 to inject air into the compartment 30 at a predetermined high or maximum rate of supply. This stage of the smoke cycle may be set to last for between 2-3 minutes to ensure that combustion of the fuel has successfully started. The oven temperature is also adjusted to the preset cooking temperature set by the user. Fan 28 may also be activated to draw smoke from chamber 13, through CSE 26 (removing smoke and the smoky smell therefrom) and into the environment around the cooking appliance.

Step 55c—Smoking begins.

As the fuel begins to burn, smoke is produced within smoker compartment 30 and is released into chamber 13 via holes 35 in lid 34. At the end of the ignition period the igniter may be de-energised (either turned off or its output power reduced) and air injector 37 may reduce the rate of supply of air to a lower or minimum value to simply sustain smouldering of the fuel. It is known that a fuel load of between around 20-25 g of Oak wood pellets will provide between 1.5-2 hours of smoking time. It is therefore expected that the fuel in the compartment 30 will be used up by the end of a 2 hour smoke cycle so that smoke production in the oven will have stopped. If the user-set cooking smoking period is less than this nominal period then controller 18 may inform the user, via the user interface, that a reduced fuel load should be added to container 30.

Step 55d—Controller 18 deactivates the chamber door latch 24.

At the end of the cooking/smoking period set by the user, air injector 37 is preferably de-activated and the chamber door is unlocked so that the user may remove the smoked and cooked food items from the oven chamber. Alternatively, the controller may wait a short period of time after the end of the preset or user-set period to ensure that smoke generation has stopped, before allowing the door to be opened (particularly in cases where the preset/user-set smoking/cooking time is shorter than a predetermined theoretical maximum combustion period sustainable by the fuel volume of container 30).

Step 56—The user removes food items 14 from oven chamber 13.

Food items 14 are smoked, and cooked, ready for serving.

Step 57—Once the user has completed smoking/cooking the food items, he or she may select an oven self-cleaning function on the user interface of the cooking appliance.

Once the smoke cycle is complete, and no further smoking or cooking is required it is recommended to clean the oven 12. The oven 12 preferably has a pyrolytic cleaning function—door latch 24 is activated to lock the door in a closed position and the temperature inside the chamber is elevated to a high temperature, preferably to a temperature in a range of 400-500° C., which reduces grease, smoke residue and food residue to ash. During the pyrolytic cleaning operation the CSE 26 and fan 26 may still be operated. Once the oven has cooled door latch 24 is released and the user may then remove the residual ash by vacuuming or sweeping away the ash from oven chamber 13 and smoker compartment 30.

Additional Monitoring

In conjunction with the smoking procedure (steps 50-57), it may be desirable to also monitor air temperature in, and/or exiting from, the oven chamber 13. For example, air temperature at the chamber vent, downstream of the catalytic smoke eliminator 26, provides an indicator of smoke "density". The air temperature downstream of the CSE 26 increases with an increased amount of smoke, and conversely, the air temperature decreases as the amount of smoke reduces towards the end of the smoke cycle. Accordingly, controller 18 may also receive data from a temperature probe (not shown) in the oven vent downstream of the CSE 26 and determine that the fuel has been consumed from a drop in detected temperature (for example, a drop below a threshold temperature that may be at a fixed or percentage offset from the preset or user-set oven temperature). As an alternative, it may be determined that the fuel has been consumed by transmitting light through the gases in the oven chamber, in a similar manner to a domestic or industrial smoke detector so that the presence or level of smoke in the chamber can be determined. The determination that the fuel has been exhausted can be relayed to the user via the user interface so that the user may have the option to add further fuel and carry out ignition step 55b once more to continue smoking (the controller will of course need to de-energise and then re-energise the door latch 24 to enable access to the oven chamber). When it is determined that smoke generation has ended, for example by detecting a temperature drop downstream of the CSE 26, even though the end of the user-set smoking/cooking period has not yet been reached, controller 18 may de-activate air injector 37.

Monitoring the air temperature within smoker compartment 30 also provides insights into the burn condition within compartment 30. Accordingly, the controller 18 may use the output of a smoker compartment temperature probe (not shown) to detect and monitor smoker compartment temperature while the igniter is not energised. A high temperature may indicate that combustion has been initiated and a drop in temperature may indicate that fuel is nearly exhausted or that combustion has been completed. However, a drop in temperature may also indicate that fuel still exists within compartment 30 but that a lack of oxygen is suffocating combustion within container 30. In such a case the flow rate of air from air injector 37 may be increased to ensure that combustion continues until the smoker compartment temperature reaches a desirable, higher value at which point the flow rate of air injector 37 can again be reduced. In this way, the speed of air pump 41 can be adjusted to achieve an optimal burn of the fuel within smoker compartment 30. If required, igniter 43 could also be re-energised for a predetermined time period (another 2-3 minutes, for example), with or without a change in air flow rate. A smoker compartment temperature probe may also enable detection of "flare-ups" of flames within the compartment causing a sudden increase in temperature. Detected undesirable flare-ups can be reduced to desirable smouldering combustion by reducing or cutting air supply to smoker compartment 30 by turning air pump 41 down/off (and optionally, by reducing or stopping smoke extraction by appropriately controlling fan 28).

Advantages

Advantages identified in the preferred embodiments of the invention will now be discussed. Alternative embodiments of the present invention may also have one or more of these advantages.

There is a convenience in not having to store the smoker 20 as a separate unit—it is built into the oven of the cooking appliance.

The user does not need to make any connections related to the smoker 20 when setting up or installing the cooking appliance or when it is being used to smoke food items.

The compartment 30 and lid 34 are cleaned along with the chamber 13 during the cooking appliance's pyrolytic cleaning process.

It is easy for the user to load fuel into the smoker compartment 30 by simply opening chamber door 17 and lifting lid 34.

Smoke soil and smoke smell are completely contained inside the oven 12 and so there is no contamination of the surroundings of the cooking appliance, such as a domestic kitchen inside the user's house.

Smoke production can be monitored by sensors connected to the smoker 20 and/or oven 12 so that combustion can be automatically monitored/controlled.

Because the smoker 20 is formed in a recess or opening in the oven base 31, the risk of a user accidentally destabilising the smoker 20 (by tipping, knocking or bumping—which conventional smokers are susceptible of) is therefore eliminated, particularly as access to the smoker compartment 30 is restricted by door latch 24.

The injection of air into smoker compartment 30 enhances the ignition of the fuel and ensures smoke generation is quickly and well established from the start of the smoke cycle.

A steady supply of air in smoker compartment 30 throughout the smoke cycle is ensured to provide continuous burning of the fuel during the smoking/cooking period. A steady supply of smoke is therefore generated.

Injection of air ensures that all of the fuel is exhausted by the end of the cooking/smoking period to thereby provide a "clean burn" at the end of the smoke cycle, avoiding smoke generation at the end of the nominal 1.5-2 hour smoking/cooking period so that once the oven chamber door 17 is opened, smoke will not escape into the cooking appliance's surroundings.

The smoke regulation holes 35 in compartment lid 34 ensure a controlled flow of smoke out of the smoker compartment (aided by incoming air from air injector 37) and into oven chamber 13.

As the smoker compartment 30 and air pump 41 are integrated into oven 12, the oven can monitor and control the flow of air into the compartment 30 to detect flame flare-ups during the smoke cycle and act to dampen them.

The invention claimed is:

1. A cooking appliance, comprising:
a cooking chamber for cooking food, the cooking chamber having a base, at least one wall and a door for closing the cooking chamber, and
a smoke generator in the cooking chamber comprising:
a compartment in the base, a wall or the door of the cooking chamber for smoke generation, the compartment configured to receive a combustible fuel for generating smoke,
an igniter in or installable in the compartment,
a fluid injector in the compartment, and
a fluid pump controllable to inject combustion-enhancing fluid into the compartment via the fluid injector,
the cooking appliance further comprising a door lock for locking the door of the cooking chamber in a closed position, and
a controller connected to the igniter, the door lock and the fluid pump and configured to, when a smoking cycle of the cooking appliance is activated, lock the door of the cooking chamber in a closed position, activate the fluid injection pump to inject combustion-enhancing fluid into the compartment via the fluid injector, and energise the igniter to ignite the combustible fuel and generate smoke therefrom.

2. The cooking appliance according to claim 1, wherein:
the compartment is formed as a recessed cavity in the base, a wall or the door of the cooking chamber, and/or
the compartment is disposed in the base, wall or door of the cooking chamber.

3. The cooking appliance according to claim 1 or claim 2, wherein the compartment is located in the cooking chamber base at or adjacent to the door.

4. The cooking appliance according to claim 1 or claim 2, wherein the compartment is configured to receive and hold a discrete charge of a combustible fuel for generating smoke.

5. The cooking appliance according to claim 1 or claim 2, wherein the igniter is a resistive tubular sheath heater.

6. The cooking appliance according to claim 1 or claim 2, wherein the compartment has a single access opening located within the cooking chamber and further comprising a removable or hinged lid for closing the single access opening.

7. The cooking appliance according to claim 6, wherein the removable lid is provided with at least one vent hole therein.

8. The cooking appliance according to claim 1 or claim 2, further comprising a vent via which gases from the cooking chamber may be exhausted wherein a catalytic smoke eliminator is provided for removing smoke from the exhaust gases.

9. The cooking appliance according to claim 1 or claim 2, comprising an oven wherein the door closes and hermetically seals the cooking chamber.

10. The cooking appliance according to claim 1 or claim 2, further comprising a venting fan for drawing gases from the cooking chamber, wherein the venting fan is also connected to the controller and the controller is further configured to energise the venting fan, either during the smoking cycle or after the smoking cycle has completed.

11. The cooking appliance according to claim 10, wherein the controller is further configured to, at the end of the smoking cycle, deactivate the fluid injection pump and unlock the door of the cooking chamber.

12. The cooking appliance according to claim 10, wherein the controller is further configured to preheat the cooking chamber, prior to locking the door of the cooking chamber.

13. The cooking appliance according to claim 10, wherein following the completion of a smoking cycle, when a self-clean function of the cooking appliance is activated, the controller locks the door of the cooking chamber in the closed position.

14. The cooking appliance according to claim 1 or claim 2, further comprising a vent via which gases from the cooking chamber may be exhausted wherein a catalytic smoke eliminator is provided for removing smoke from the exhaust gases, and a venting fan, wherein the venting fan draws gases from the cooking chamber, through the catalytic smoke eliminator, for expulsion via the vent, and wherein the venting fan is also connected to the controller and the controller is further configured to energise the venting fan, either during the smoking cycle or after the smoking cycle has completed.

15. The cooking appliance according to claim 14, wherein the controller is further configured to, at the end of the smoking cycle, deactivate the fluid injection pump and unlock the door of the cooking chamber.

16. The cooking appliance according to claim 14, wherein the controller is further configured to preheat the cooking chamber, prior to locking the door of the cooking chamber.

17. The cooking appliance according to claim 14, wherein following the completion of a smoking cycle, when a self-clean function of the cooking appliance is activated, the controller locks the door of the cooking chamber in the closed position.

18. The cooking appliance according to claim 1, wherein the controller is further configured to, at the end of the smoking cycle, deactivate the fluid injection pump and unlock the door of the cooking chamber.

19. The cooking appliance according to claim 1, wherein the controller is further configured to preheat the cooking chamber, prior to locking the door of the cooking chamber.

20. The cooking appliance according to claim 1, wherein following the completion of a smoking cycle, when a self-clean function of the cooking appliance is activated, the controller locks the door of the cooking chamber in the closed position.

* * * * *